Figure 1:
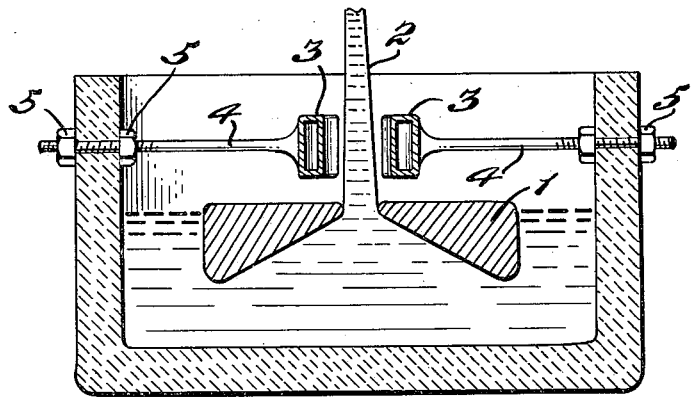

March 9, 1943. R. TANBERG 2,313,495

COOLING GLASS RIBBON IN FOURCAULT MACHINES

Filed July 19, 1939

Inventor,
Ragnar Tanberg
By: Glascock Downing & Seebold Attys.

Patented Mar. 9, 1943

2,313,495

UNITED STATES PATENT OFFICE 2,313,495

COOLING GLASS RIBBON IN FOURCAULT MACHINES

Ragnar Tanberg, Aaskollen, Drammen, Norway; vested in the Alien Property Custodian Application July 19, 1939, Serial No. 285,397 In Norway February 15, 1938

4 Claims. (Cl. 49—17)

The present invention relates to means for cooling a ribbon of drawn glass.

In the manufacture in an endless ribbon of glass on Fourcault machines it is difficult to obtain a uniform thickness of the ribbon of glass throughout its entire breadth. In particular this disadvantage occurs at the transition to some other thickness of glass. The ribbon of glass mostly becomes too thick at the middle portion and too thin at the edges, or conversely. Attempts have been made to obviate this disadvantage by isolating the cooling apparatus arranged on both sides of the glass ribbon at those positions at which the latter becomes too thick. By these means the glass ribbon is kept soft longer at those places, so that the thickness can become equalized during the drawing. In this process, however, there is the disadvantage that it is difficult to obtain uniform temperature transitions over the entire breadth of the ribbon of glass. In particular, comparatively large differences of temperature occur at those places at which the isolation ceases, and undesirable stresses are thereby produced in the glass. In order to obviate this an attempt has already been made to arrange the isolation with as uniform a transition as possible, but a satisfactory result has not yet been successfully obtained in this way.

Moreover cooling tubes of various forms have been employed, which are intended to exert a different cooling action upon the ribbon of glass transversely to the direction of drawing. This however has the disadvantage that a large selection of differently shaped tubes has to be kept in stock, and the tubes have to be exchanged during operation.

An attempt has also been made to meet the above-mentioned difficulty by varying the distance between the cooling tubes and the ribbon of glass over the breadth of the latter, by providing the central portion of the tube with a curve, which can be brought nearer to or further from the ribbon of glass by rotating the cooling tube about its longitudinal axis.

A further suggestion that has been made is to vary the cooling medium at various positions on the ribbon, by providing a cooling chamber at each edge and a cooling chamber on each side of the ribbon of glass, substantially over its entire breadth.

Here again, however, abrupt temperature transitions occur, which result in imparting undesirable stresses to the glass.

The present invention accordingly consists in the feature that the cooling appliance for a variable cooling over the entire breadth of the ribbon of glass is so designed as to be able to furnish at will either a uniform cooling throughout the breadth of the ribbon or a cooling variable from the middle of the ribbon to its edges, from a maximum to a minimum or conversely, this result being obtained by using flexible tubes for the cooling appliance and imparting different curvatures to the flexible tubes.

Figure 2:
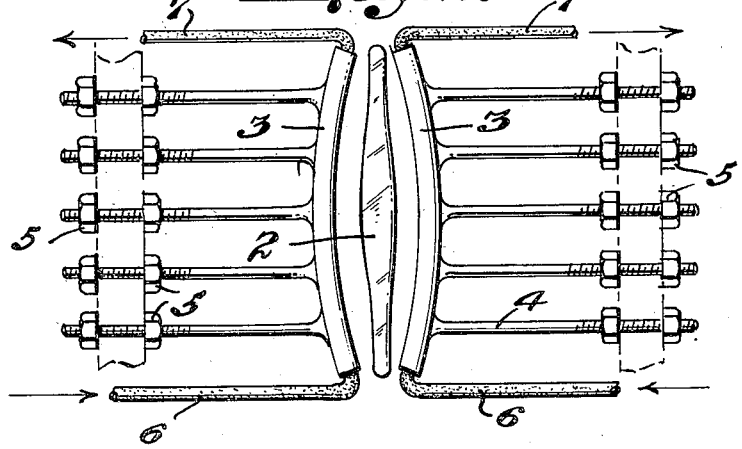
Figure 3:
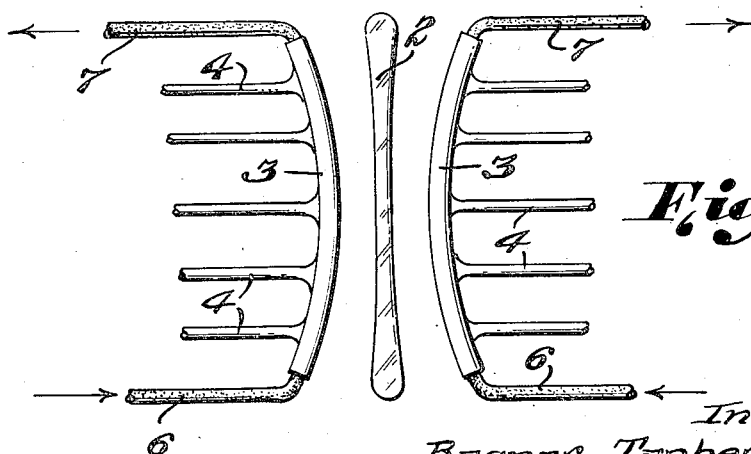

Apparatus for carrying out the invention is diagrammatically illustrated by way of example in the accompanying drawing, in which Figure 1 shows in sectional elevation the usual nozzle or débiteuse of the Fourcault machine, with the ribbon of glass ascending therefrom, and the cooling appliances arranged on both sides of the latter;

Figures 2 and 3 are plan views of cooling apparatus consisting of curved cooling tubes;

In Figure 1, I is the nozzle or débiteuse pressed into the bath of glass, and 2 is the ribbon or cordon of glass ascending therefrom. On both sides of the ribbon of glass 2 are arranged cooling appliances, which extend throughout the entire breadth of the ribbon. According to the invention these cooling appliances comprise tubes 3 of flexible material, so that the curvature thereof can be varied by means of a relatively large number of rods 4. The tubes 3 are substantially flat in cross-section as shown in Fig. 1 and when these tubes are formed of a suitable flexible material such as copper they may be readily bent by the rods 4. By this variable curvature, which has the effect of varying the distance between the cooling tubes 3 and the glass ribbon 2, a ribbon of uniform thickness can be readily obtained.

The rods 4 are secured to the tubes 3 and these rods may extend through openings in the walls of the apparatus to support the flexible tubes 3. The rods 4 may be moved longitudinally and retained in such adjusted positions by means of nuts 5 threaded on the rods 4 and engaging opposite walls of the apparatus. A cooling medium may be conducted to each flexible tube 3 by means of a hose 6 and the cooling medium passing through the tubes 3 may be exhausted through flexible conduits 7.

If the glass ribbon 2, as illustrated for example in Figure 2, has a greater thickness in the middle than at the edges, the cooling tubes 3 arranged on both sides of the ribbon are brought into a form which is concave to the plane of the glass ribbon so that the central portion of the cooling tube is at a greater distance from the glass ribbon than the ends of the tube.

If, however, the glass ribbon 2 is thinner in the centre than at its longitudinal margins, as shown in Figure 3, the two cooling tubes are bent to a curvature which is convex to the plane of the ribbon of glass, so that the central portion of each cooling tube is nearer to the glass ribbon than the ends of the tube. By this arrangement and construction of the cooling tubes the result is obtained that where the distance between the tube 3 and the glass ribbon 2 is greatest, the glass remains soft longer, so that in the drawing operation an equalization of the thickness of the glass takes place automatically.

The invention is not of course limited to the particular embodiment illustrated, other forms of construction also being possible.

What I claim is:

1. Apparatus for cooling a ribbon of glass produced when drawing glass by the Fourcault process comprising, flexible tubes receiving a current of a cooling medium arranged on both sides and transversely of the ribbon of glass, and means for varying the distance of different parts of the flexible tubes from the ribbon of glass.

2. Apparatus for cooling a drawn ribbon of glass comprising, a flexible tube arranged along each face of the ribbon of glass, said flexible tubes extending transversely of the ribbon of glass and adapted to guide a current of a cooling medium therethrough, and means for bending each flexible tube to vary the distance of portions of each tube from the ribbon of glass.

3. Apparatus for cooling a drawn ribbon of glass comprising, a flexible tube arranged along each face of the ribbon of glass, said flexible tubes extending transversely of the ribbon of glass and adapted to guide a current of a cooling medium therethrough, and rods connected to said tubes at spaced intervals for bending the flexible tubes to vary the distance of portions of each flexible tube from the ribbon of glass.

4. Apparatus for cooling a drawn ribbon of glass comprising, a tube formed of flexible material arranged along one face of the ribbon of glass, said flexible tube extending transversely of the ribbon of glass and having a cooling medium passing therethrough, and means for bending a portion of the flexible tube with respect to another portion thereof to vary the distance of said portions of the tube from the ribbon of glass.

RAGNAR TANBERG.